(12) United States Patent
Brostmeyer et al.

(10) Patent No.: US 7,397,144 B1
(45) Date of Patent: Jul. 8, 2008

(54) BEARING-LESS FLOATING WIND TURBINE

(75) Inventors: Joseph Brostmeyer, Jupiter, FL (US); John E Ryznic, Palm Beach Gardens, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 216 days.

(21) Appl. No.: 11/437,531

(22) Filed: May 18, 2006

Related U.S. Application Data

(60) Provisional application No. 60/690,855, filed on Jun. 15, 2005.

(51) Int. Cl.
| | |
|---|---|
| F03B 13/10 | (2006.01) |
| F03B 13/00 | (2006.01) |
| F03B 13/12 | (2006.01) |
| H02P 9/04 | (2006.01) |
| F03D 9/00 | (2006.01) |

(52) U.S. Cl. .............................. 290/53; 290/54; 290/43; 290/42; 290/44

(58) Field of Classification Search .................... 290/53, 290/54, 55, 42, 43, 44; 60/398, 505; 417/330; 415/7, 4.2; 416/132 B, 111, 85
See application file for complete search history.

(56) References Cited

U.S. PATENT DOCUMENTS

| | | | | |
|---|---|---|---|---|
| 1,181,988 | A * | 5/1916 | Breitung | ......................... 440/8 |
| 1,894,357 | A | 1/1933 | Manikowske et al. | |
| 2,153,523 | A | 4/1939 | Roberts et al. | |
| 2,177,801 | A | 10/1939 | Erren | |
| 2,237,857 | A | 4/1941 | Winderl | |
| 3,697,765 | A | 10/1972 | Carini | |
| 3,912,937 | A * | 10/1975 | Lesser | ......................... 290/43 |
| 3,988,592 | A | 10/1976 | Porter | |
| 4,061,926 | A | 12/1977 | Peed | |
| 4,292,540 | A * | 9/1981 | Thompson et al. | ............ 290/55 |
| 4,508,972 | A * | 4/1985 | Willmouth | ................... 290/55 |
| 5,760,515 | A | 6/1998 | Burns | |
| 6,127,739 | A | 10/2000 | Appa | |
| 6,261,138 | B1 * | 7/2001 | Imura | ............................ 440/8 |
| 6,294,844 | B1 | 9/2001 | Lagerway | |

(Continued)

Primary Examiner—Julio Gonzalez
(74) Attorney, Agent, or Firm—John Ryznic

(57) ABSTRACT

A floating wind turbine in which a floating barge having a doughnut shape with an open center rigidly supports a plurality of airfoils such that a wind produces a rotation of the blades and the barge. The airfoil and barge assembly is connected to a rigid shaft that extends into a generator housing that houses a generator. Anti-rotation fins extend from the generator housing and into the water to limit rotation of the generator housing as the blades and barge rotates in the wind. Rotation of the rigid shaft due to the wind also rotates the generator shaft to produce electricity. The floating turbine supports the blades for rotation without the need for bearings so the turbine can be extremely large. The blades are supported by the floating barge so the blades can also be extremely large. The barge is doughnut shaped to limit viscous forces due to rotation of the barge within the water. A second floating wind turbine rotates within the first floating turbine but in an opposite direction. A generator includes an armature secured to the first floating turbine and a filed secured to the second floating turbine such that the generator has an effective rotation equal to the relative rotation of the two floating turbines.

22 Claims, 5 Drawing Sheets

U.S. PATENT DOCUMENTS

| | | |
|---|---|---|
| 6,734,576 B2 | 5/2004 | Pacheco |
| 6,853,096 B1 * | 2/2005 | Yu et al. .................. 290/55 |
| 6,902,447 B1 * | 6/2005 | Pittman .................... 440/8 |
| 7,235,893 B2 * | 6/2007 | Platt ....................... 290/54 |
| 7,314,346 B2 * | 1/2008 | Vanderhye et al. ........ 415/4.2 |
| 7,329,961 B2 * | 2/2008 | Marchetti ................. 290/54 |
| 2003/0146627 A1 * | 8/2003 | Parviainen ............... 290/54 |
| 2005/0134050 A1 * | 6/2005 | Salls, Jr. .................. 290/54 |
| 2006/0232075 A1 * | 10/2006 | Fraenkel ................. 290/54 |

* cited by examiner

BEARING-LESS FLOATING WIND TURBINE

CROSS-REFERENCE TO RELATED APPLICATIONS

This application claims the benefit to an earlier filed Provisional Application 60/690,855 filed on Jun. 15, 2005 and entitled Bearing-less Floating Wind Turbine.

BACKGROUND OF THE INVENTION

1. Field of the Invention

The present invention relates to a large wind turbine for generating electrical power, the wind turbine being mounted on a floating platform intended for use in a body of water, in which the floating barge also acts to support the rotor blade assembly, eliminating the need for bearings and allowing for extremely large wind turbine structures.

2. Description of Related Art including Information Disclosed Under 37 CFR 1.97 and 1.98

Prior art wind turbines come in many shapes and sizes. Vertical axis rotating blades are well known for use in electric power generation using wind. These generators can be mounted on land or on a floating barge over water. In order to generate larger electric power, the blades become extremely large, sometimes in the length of 100 meters each. As the blades become larger, the stresses that occur become so large that the modern materials used to form the rotor and blade become over-stressed. Thus, there is a limit as to how large a blade can be, and therefore there is a limit as to how much power can be produced by a single rotating structure.

One large wind turbine, which of U.S. Pat. No. 6,294,844 issued to Lagerwey on Sep. 9, 2001 shows a floating platform such as a barge or ship that supports a structure, the structure supporting a plurality of wind airfoils. The Lagerwey invention does not use a large wind airfoil, but makes use of a number of smaller airfoils. And additional embodiment shown in FIGS. 15A and 15B shows a vertical wind turbine rotatably supported by a floating ship. In this embodiment, bearings are used to support the rotating turbine, and therefore the size and weight of the rotating turbine is limited.

Another type of floating wind turbine is disclosed in U.S. Pat. No. 3,988,592 issued to Porter on Oct. 26, 1976, and discloses a floating sphere anchored to a sea bed, the sphere carrying a vertical axis wind turbine. The turbine is small and supported for rotation by bearings. As in the above mentioned Lagerwey invention, the invention of Porter is limited as to the size of the wind turbine because of the use of the bearings for rotational support.

Some prior art inventions make use of a floating turbine in which the turbine is located within the water. U.S. Pat. No. 6,734,576 issued to Pacheco on May 11, 2004 discloses in one embodiment a floating generator in which the rotary structure is completely submerged within the water flow path. The structure is supported by a floating barge.

There is a need in the art for a larger rotation device that can capture a large amount of wind to generate a large amount of electric power. It is therefore an object of the present invention to provide a large rotating structure to generator power from wind that does not require bearings to support the rotary structure. It is another object of the present invention to provide for a large airfoil surface such that the stress limitation of size in prior art rotating wind generators are not a limiting factor.

BRIEF SUMMARY OF THE INVENTION

The present invention is a floating wind turbine that does not use bearings to support the rotating blade structure so that the rotating structure can be larger than any prior art bearing supported rotating structure can be. The rotating blade structure comprises a plurality of rotating blades about a vertical axis of the floating structure that is both rotatably with and structurally supported by the floating barge. The floating barge is circular in shape and rotates with the blades extending therefrom. No bearings are needed since the floating barge rotates with the blades. The blades can be larger than prior art devices since the blades do not have to be supported by a hub attached to a rotor. Thus, the floating rotating generator of the present invention can be an extremely large structure capable of capturing a large amount of wind and generating a large amount of electric power than known prior art wind generators. In an alternate embodiment, a second floating wind turbine is located within the first and rotates in the reverse direction, where an electric generator includes an armature connected to one of the floating turbines and the field is connected to the other of the floating turbines such that the generator rotational speed is equal to the relative rotation of the two floating turbines.

DETAILED DESCRIPTION OF THE INVENTION

Figure 1:
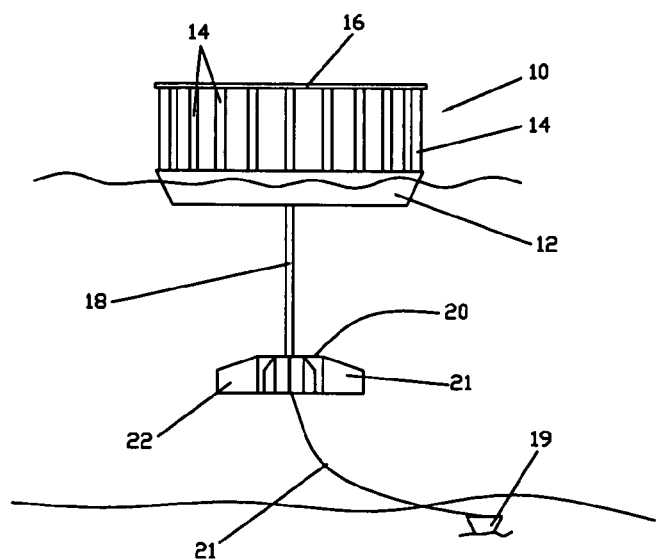
FIG. 1 shows a side view of the first embodiment of the floating wind turbine.
Figure 2:
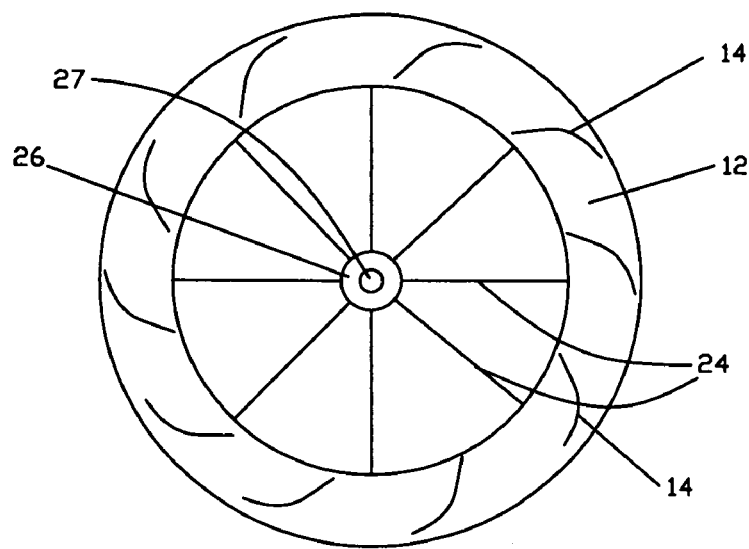
FIG. 2 shows a top view of the floating portion of the invention with support arms extending radially inward.

The present invention is a floating wind turbine in which a rotor blade assembly is secured to a floating barge member, where the floating barge rotates along with the turbine rotor blades. FIG. 1 shows a first embodiment of the present invention, in which the floating wind turbine 10 includes a floating barge 12 having a doughnut shape, the barge being open in the center as shown in FIG. 2. The floating barge 12 is doughnut shaped in order to reduce the viscous force that would act on the barge as the barge rotates in the water. The barge could be any shape as long as the barge can support the rotor blade assembly. Attached to the floating barge 12 are rotor blades spaced around the perimeter of the floating barge 12. The blades extending in a vertical direction, and are secured to a top plate 16 to provide support for the rotor blade assembly. Extending inward from the floating barge 12 are a plurality of support arms 24 that connect to a center piece 26, the rigid shaft 18 being connected to the center piece 26. The floating barge 12 and the rotor blades 14 form a rigid member that rotates in the water together around the axis of the floating barge.

Figure 3:
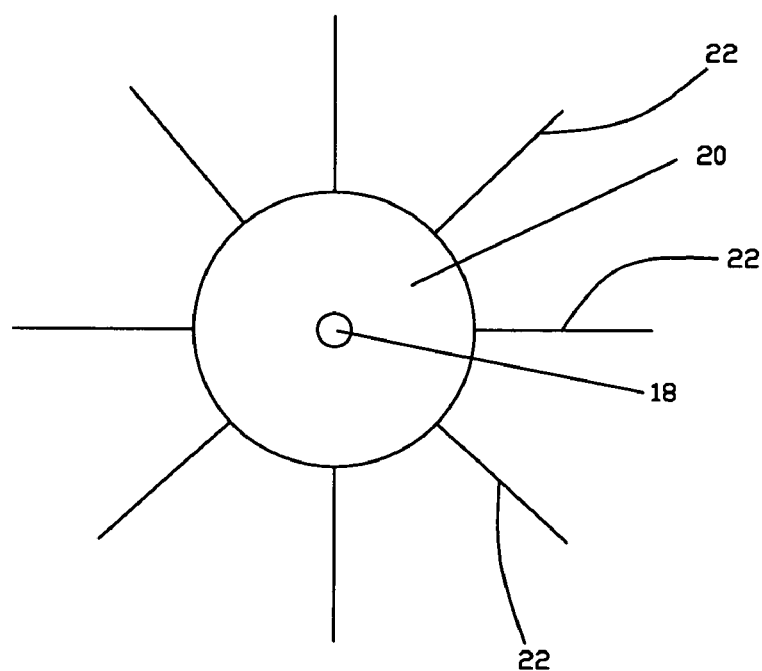
FIG. 3 shows a top view of the generator portion submerged below the water surface.
Figure 7:
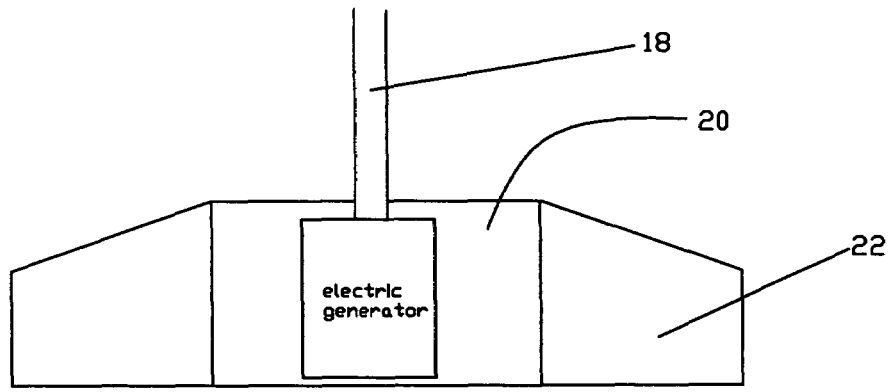
FIG. 7 shows a side view of the submerged generator housing.

Attached to the floating barge/rotor blade assembly is a rigid shaft 18 extending downward from the floating barge 12. The rotating shaft 18 can be connected to the blades at the top of the structure, at a point midway along the blades, or at a point at the bottom of the blades, or the rigid shaft 18 can be connected to the floating barge by any known means to rigidly connect the barge to the rigid shaft 18. The rigid shaft 18 extends into a generator housing 20 best shown in FIG. 7, the generator housing being submerged below the water surface during operation of the wind turbine. Extending from the generator housing in a radial outward direction is a plurality of fins 22, best seen in FIG. 3. The fins 22 provide a resistance to rotation of the generator housing 20 with respect to the rotating barge 12 and rotor blade assembly. The rigid shaft 18 passes through a sealed opening in the top of the generator housing 20 and connects to a generator mounted in the housing 20. Rotation of the shaft 18 drives the electrical generating capability of the generator. The rotating shaft 18 can be connected directly to the generator shaft or through a gear box to increase the rotation of the generator shaft at a desired multiple of the turbine shaft 18.

By securing the rotor blades to the floating barge and having the floating barge rotate with the rotor blades, bearings to support the rotor and blades are not needed. The size of a large wind turbine is limited to the structural capabilities of the bearing structure. It is desirable to use the largest wind turbine surface possible in order to capture a greater amount of wind for power generation. Using the floating barge to support the rotor blades in the present invention avoids the need for a bearing structure, and therefore an extremely large wind turbine can be successfully operated.

Another benefit of the present invention is that prior art large wind turbines used in bodies of water were supported by the sea bed or water body floor, and not floating. Thus, these large wind turbines had to be located close to the shore. The present invention—because it is floating and not supported by the sea floor—can be used in deep waters.

Operation of the floating wind turbine 10 will now be described. The floating wind turbine 10 is placed in a water surface such as an offshore position in the Atlantic Ocean. A wind stream passes over the rotor blades 14 and causes the rotor assembly to rotate. Since the floating barge 12 is rigidly secured to the rotor blade assembly, the floating barge 12 will rotate with the rotor blade assembly 14. The entire blade/barge assembly will rotate the rigid shaft 18, the shaft 18 being connected to a generator located in a generator housing 20 submerged below the water surface and below the floating barge 12. The fins 22 secured to the generator housing 20 limit rotation of the generator housing due to the resulting force that rotates the barge/rotor assembly. The rotating shaft 18 then drives the generator to produce electric power. An electric power line can be connected to the generator to deliver the electric power to an end user on shore or near the floating barge 12.

Figure 4:
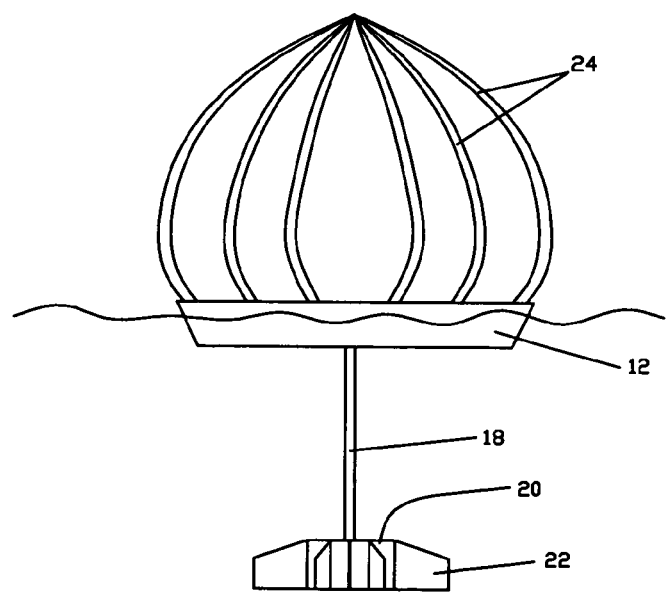
FIG. 4 shows a side view of a second embodiment of the floating wind turbine in which the rotor blades are of the Darrieus blade type.

FIG. 4 shows a second embodiment of the present invention in which the rotor blade assembly is a well known Darrieus rotor blade assembly. In the FIG. 4 embodiment, the rotor blades are secured together at the top and secured to the floating barge at the bottom. Like in the first embodiment shown in FIG. 1, the floating barge is doughnut shaped. The rotating shaft 18 is connected to the floating barge as shown in FIG. 2 by using a series of support arms 24 extending from the doughnut shaped barge 12 to a center piece 26 on which the shaft 18 is secured. The submerged generator housing 20 is like that disclosed in the first embodiment of FIG. 1.

Figure 5:
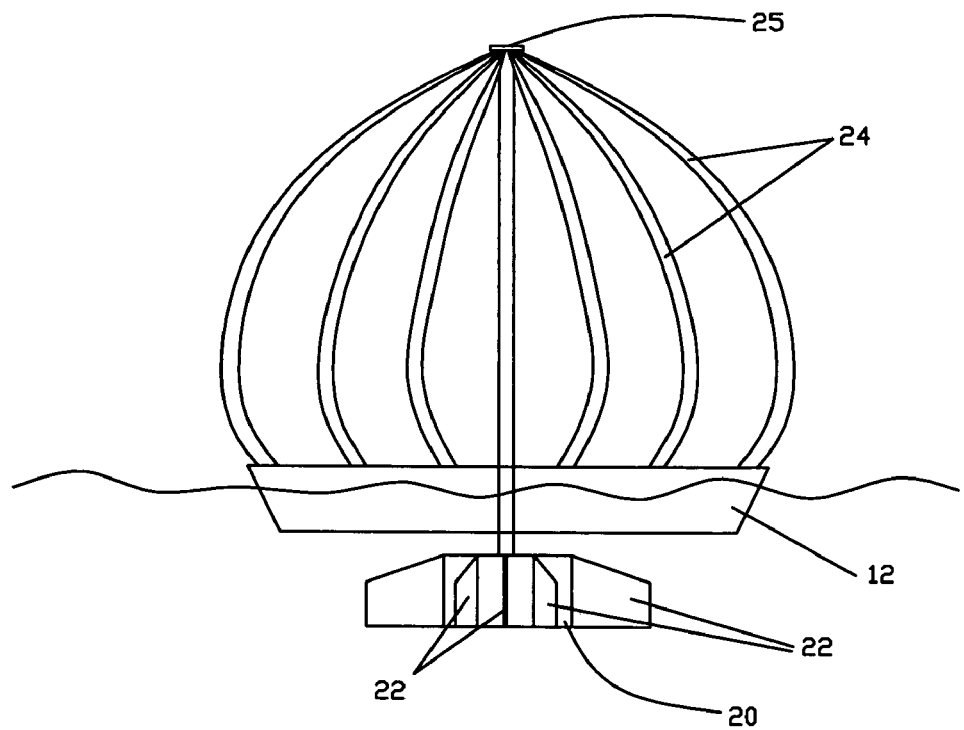
FIG. 5 is a side view of a third embodiment of the present invention in which the submerged generator housing is located just below the water surface.

A third embodiment of the floating wind turbine is shown in FIG. 5, where the submerged generator housing 20 is located just below the floating barge 12. The rotating shaft 18 is secured to a top center piece 25 in which the Darius rotor blades 24 connect at the top of the blades. The rotating shaft 18 extends downward from the top center piece 25 and connects to the generator located within the generator housing 20 submerged below the barge 12. The generator housing 20 also includes the fins 24 to limit rotation of the generator housing with respect to the floating barge 12.

A fourth embodiment of the present invention is disclosed in FIG. 6, in which a rotor blade assembly like the one used in the FIG. 1 embodiment has the rotating shaft 18 secured to the top plate 16 of the rotor blade assembly, the rotating shaft 18 extending down through the rotor blade assembly and into the generator housing submerged just below the floating barge 12 as in the FIG. 5 embodiment. The generator housing 20 is shown located below the floating barge 12 in order to ensure that the fins 22 will be totally submerged in the water to maximize their anti-rotation ability.

Figure 6:
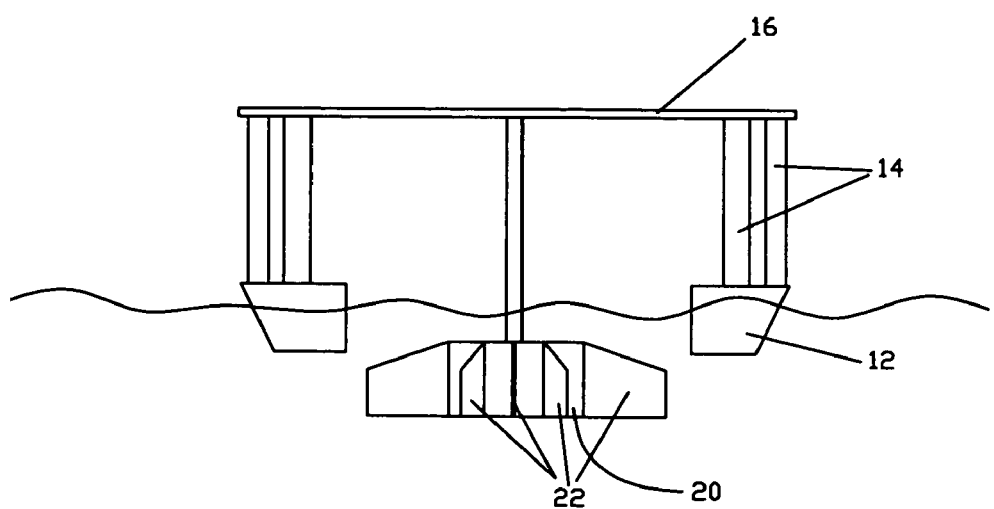
FIG. 6 is a side view of a fourth embodiment of the present invention in which the rotor shaft extends from a top bracket into the generator housing.

Operation of the embodiments disclosed in FIGS. 4, 5, and 6 are the same as the embodiment disclosed in FIG. 1. A wind stream acts on the rotor blade assembly to rotate the blade assembly, causing the floating barge to also rotate. Rotation of the blade/barge assembly causes the rotating shaft 18 to also rotate. The rotating shaft is connected to an electric generator secured within the generator housing 20. fins 22 on the generator housing 20 minimize the rotation of the generator housing and allow for a relative rotation between the shaft 18 and the generator to produce electric power.

Figure 8:
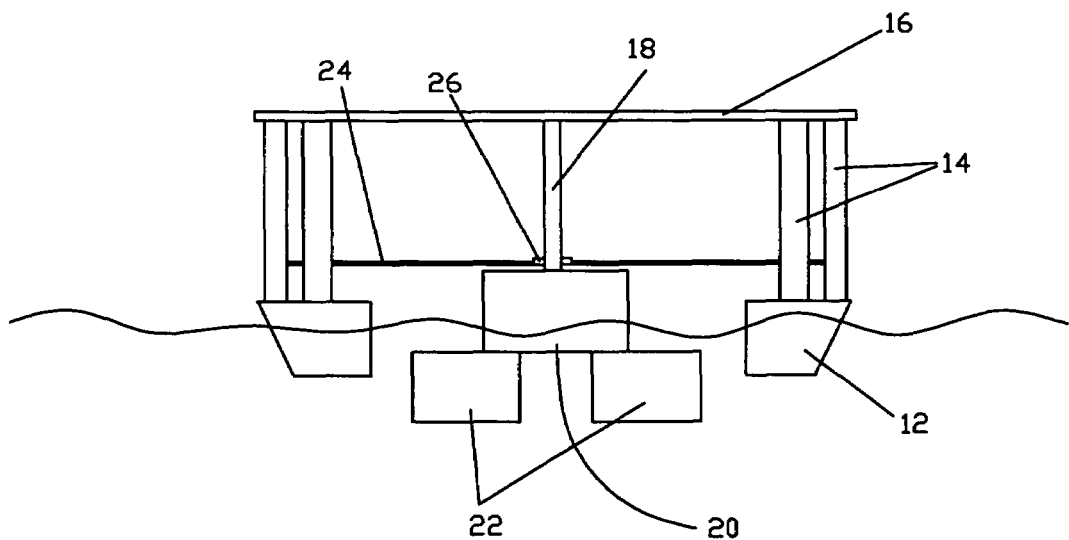
FIG. 8 shows a side view of a fifth embodiment of the present invention in which the generator housing floats above the water surface.

In order to reduce the chance of water seeping into the submerged generator housing; a further embodiment is disclosed in FIG. 8 in which the generator housing 20 also floats above the water surface. To minimize rotation of the generator housing, the fins 22 can extend downward from the floating generator housing 20 and into the water. Since the floating barge is doughnut shaped, the floating generator housing can easily fit within the open space. The support arms 24 shown in FIG. 2 can extend into a center piece 26 located just above the generator housing to support the rotating shaft 18. The operation of the wind turbine in FIG. 8 is the same as described in other embodiments.

One additional feature that can be applied to each of the above disclosed embodiments is to allow for the barge 12 to be filled with water in the event of an approaching storm that could damage the floating wind turbine. The barge could be submerged below the water surface to reduce damage from the storm. Since the generator housing is sealed from water seeping into it, sinking or submerging the barge will not affect the generator secured within the generator housing 20.

Figure 9:
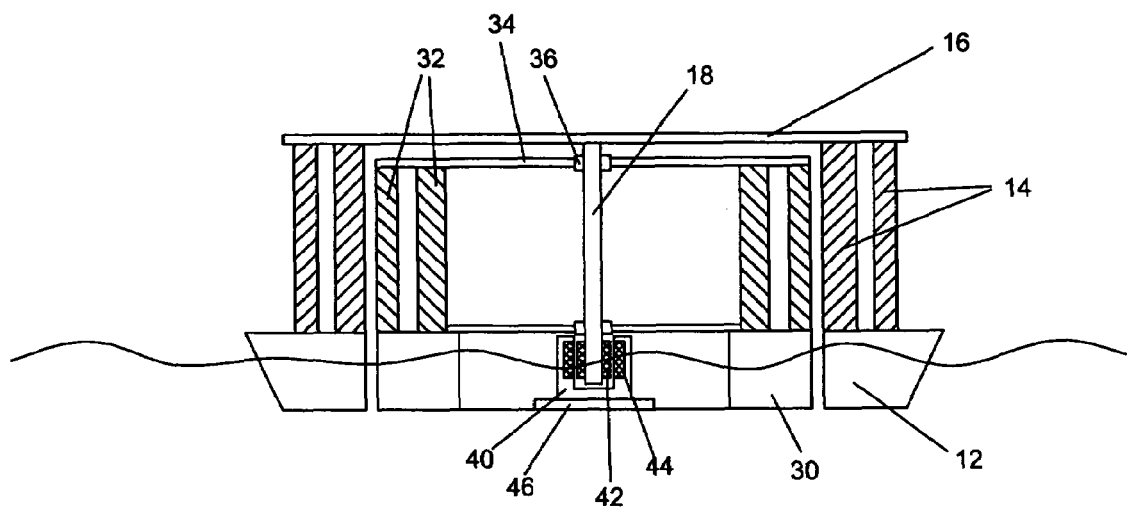
FIG. 9 shows across section view of a sixth embodiment of the present invention in which a second floating wind turbine rotates inside the first floating wind turbine.
Figure 10:
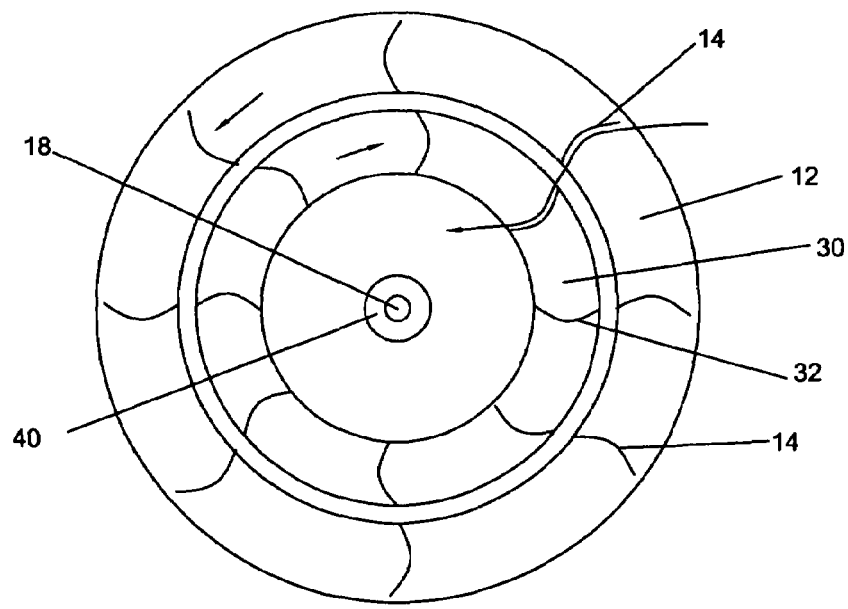
FIG. 10 shows a top view of the embodiment in FIG. 9.

A sixth embodiment of the present invention is shown in FIGS. 9 and 10. In this embodiment, a second floating wind turbine 30 is positioned to rotate within the first floating wind turbine 12, but in the opposite direction. The blades 32 of the second floating turbine 30 are curved in the opposite direction than are the blades 14 in the first floating turbine 12 as seen in FIG. 10. Wind passing past the first blades 14 will pass against the second blades 32 and cause rotation of the second floating turbine 30 in the opposite direction. A generator housing 40 includes an armature 42 rotatably secured to the shaft 18 that rotates with the first floating turbine 12, and a field 44 that is rotatably secured to the generator housing 40. The generator housing is secured to a support member 46 that rotates with the second floating turbine 30. When the two floating turbines rotate in opposite directions, the generator effectively spins are the relative rotational rate of the two turbines. The second floating turbine 30 therefore replaces the anti-rotational fins 22 of previous embodiments, and provides for more electric power generation because the effective spin rate of the generator is nearly doubled.

We claim:

1. A floating wind turbine, comprising:
    a barge capable of floating in a body of water;
    a plurality of airfoils extending from the barge, the barge and the airfoils forming a rigid structure capable of rotating together as a unit;
    a generator housing located adjacent to the barge, the generator housing containing an electric generator secured therein;
    anti-rotation means mounted on the generator housing to limit rotation of the generator housing in the water;
    a rigid shaft connected to a rotational shaft of the generator; and,
    mechanical connecting means to connect the barge and airfoil unit to the rigid shaft such that rotation of the barge and airfoil unit produces rotation of the generator shaft and therefore electric power.

2. The floating wind turbine of claim 1, and further comprising:
    the barge is circular in shape.

3. The floating wind turbine of claim 2, and further comprising:
    the barge is doughnut shaped such that viscous forces between the barge and the water are reduced; and,
    the rigid shaft passes through the opening in the doughnut shaped barge to the generator housing.

4. The floating wind turbine of claim 1, and further comprising:
    the plurality of airfoils being a squirrel cage blade type turbine.

5. The floating wind turbine of claim 1, and further comprising:
    the plurality of airfoils being a Darrieus blade type turbine.

6. The floating wind turbine of claim 1, and further comprising:
    the generator housing being submerged in the body of water; and,
    the anti-rotation means comprising a plurality of fins extending from the generator housing outward into the water.

7. The floating wind turbine of claim 1, and further comprising:
    the generator housing floating on the water within an opening formed in the barge; and,
    the anti-rotation means comprising a plurality of fins extending from the generator housing and into the water.

8. The floating wind turbine of claim 1, and further comprising:
    a gear box connected between the generator shaft and the rigid shaft to step up a rotation of the rigid shaft to the generator shaft.

9. The floating wind turbine of claim 1, and further comprising:
    an anchor line connecting the floating wind turbine to an anchor secured on a bottom surface of the body of water.

10. The floating wind turbine of claim 1, and further comprising:
    the anti-rotation means comprises a second floating wind turbine that rotates in an opposite direction to the first floating turbine.

11. The floating wind turbine of claim 10, and further comprising:
    the second floating wind turbine is located inside the first floating turbine.

12. The floating wind turbine of claim 1, and further comprising:
    the generator includes a field and an armature, and where the field is secured to rotate with one of the first and second floating turbines, and the armature is secured to rotate with the other of the first and second floating turbines.

13. A process for producing electric power from a wind in a body of water, the process comprising the steps of:
    floating a barge in a body of water that is exposed to a wind;
    securing a plurality of airfoils to the barge such that a wind produces rotation of the airfoils and the barge as a rigid unit;
    driving a rigid shaft from the rotation of the barge;
    locating a generator housing having an electric generator secured therein near to the barge;
    connecting the rotating rigid shaft to the electric generator; and,
    limiting rotation of the generator housing in the water as the rotating barge rotates the generator through the rigid shaft.

14. The process for producing electric power from a wind in a body of water of claim 13, and further comprising the step of:
    providing for the barge to be doughnut shaped with the rigid shaft passing through the opening of the barge.

15. The process for producing electric power from a wind in a body of water of claim 13, and further comprising the step of:
    providing for the generator housing to be submerged in the water and fins extending outward from the generator housing to limit rotation of the generator housing in the water.

16. The process for producing electric power from a wind in a body of water of claim 14, and further comprising the step of:
    providing for the generator housing to be floating in the water in the opening of the doughnut shaped barge, and fins extending from the generator housing and into the water to limit rotation of the generator housing in the water.

17. The process for producing electric power from a wind in a body of water of claim 13, and further comprising the step of:
    providing for the plurality of airfoils to be a squirrel cage blade type turbine.

18. The process for producing electric power from a wind in a body of water of claim 13, and further comprising the step of:
    providing the plurality of airfoils to be a Darrieus blade type turbine.

19. The process for producing electric power from a wind in a body of water of claim 13, and further comprising the step of:
    connecting a step-up gear box between the rigid shaft and the generator shaft in order to drive the generator as a high rotational speed than the rotating barge.

20. The process for producing electric power from a wind in a body of water of claim 13, and further comprising the step of:

anchoring the wind turbine to a bottom surface of the body of water.

21. The process for producing electric power from a wind in a body of water of claim 13, and further comprising the step of:

the step of limiting rotation of the generator housing includes the step of providing for a second floating wind turbine that rotates in an opposite direction to the first floating turbine.

22. The process for producing electric power from a wind in a body of water of claim 21, and further comprising the step of:

providing for the armature of the generator to be secured to one of the first and second floating turbines, and the field of the generator to be secured to the other of the first and second floating wind turbines such that the generator rotates at an effective speed of the relative rotation of the two floating turbines.

\* \* \* \* \*